United States Patent [19]
Keller

[11] Patent Number: 6,053,048
[45] Date of Patent: Apr. 25, 2000

[54] PRESSURE-MEASURING DEVICE

[75] Inventor: Jakob Keller, Wohlen, Switzerland

[73] Assignee: Asea Brown Boveri AG, Baden, Switzerland

[21] Appl. No.: 09/133,669

[22] Filed: Aug. 12, 1998

[30] Foreign Application Priority Data

Aug. 14, 1997 [EP] European Pat. Off. .............. 97810568

[51] Int. Cl.$^7$ ...................................................... G01L 7/00
[52] U.S. Cl. .............................................................. 73/707
[58] Field of Search .................................. 73/49.5, 49.6, 73/24.01, 25.03, 40.7, 46, 715, 716, 756, 707; 60/39.25, 39.161, 235

[56] References Cited

U.S. PATENT DOCUMENTS

| | | | |
|---|---|---|---|
| 2,486,133 | 10/1949 | Egger | 73/707 |
| 3,777,479 | 12/1973 | Hagen | 60/39.25 |
| 4,299,253 | 11/1981 | Burton | 73/707 |
| 4,517,844 | 5/1985 | Powell | 73/756 |
| 4,668,889 | 5/1987 | Adams | 73/707 |
| 5,020,360 | 6/1991 | Brosi et al. | 73/715 |
| 5,284,060 | 2/1994 | Martinez | 73/707 |
| 5,390,546 | 2/1995 | Wlodarczyk | 73/716 |
| 5,419,182 | 5/1995 | Koshimizu et al. | 73/46 |
| 5,494,826 | 2/1996 | Stetter et al. | 73/24.01 |

FOREIGN PATENT DOCUMENTS

| | | |
|---|---|---|
| 6-331146 | 11/1994 | Japan . |
| 2037993 | 7/1980 | United Kingdom . |

*Primary Examiner*—William Oen
*Attorney, Agent, or Firm*—Burns, Doane, Swecker & Mathis, L.L.P.

[57] ABSTRACT

In a pressure-measuring device (10) for measuring pressure fluctuations in a space (15) which is filled with hot gases at a first temperature (T1) and is delimited by at least one wall (12, 14) from an outer space (28) which is at a lower second temperature (T3), in particular for measuring pressure fluctuations in the combustion chamber (15) of a gas turbine (11), a measuring tube (16) largely free of end reflections with regard to the pressure fluctuations is passed from the space (15) through the at least one wall (12, 14) into the outer space (28), and, in the outer space (28) behind the at least one wall (12, 14), a pressure sensor (18) for sensing the pressure fluctuations is connected to the measuring tube (16, 21, 23). In such a pressure-measuring device (10), a high measuring accuracy is achieved in a simple manner owing to the fact that provided on the measuring tube (16) are first means which prevent disturbing reflections of the pressure waves, spreading in the measuring tube (16), at jumps in temperature in the measuring tube (16) or render said reflections harmless before entry into the pressure sensor (18).

10 Claims, 2 Drawing Sheets

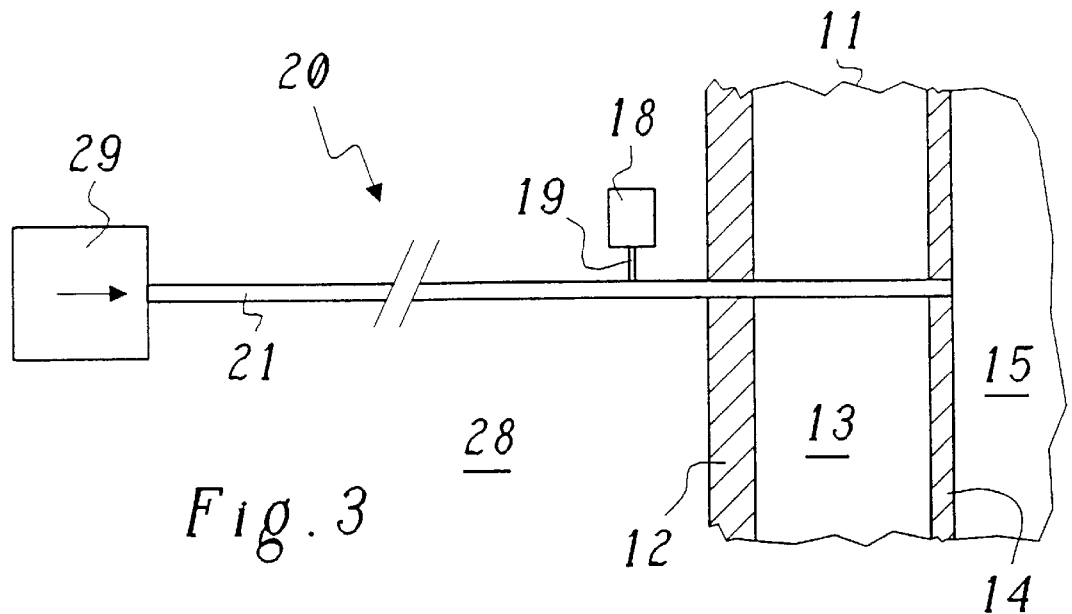
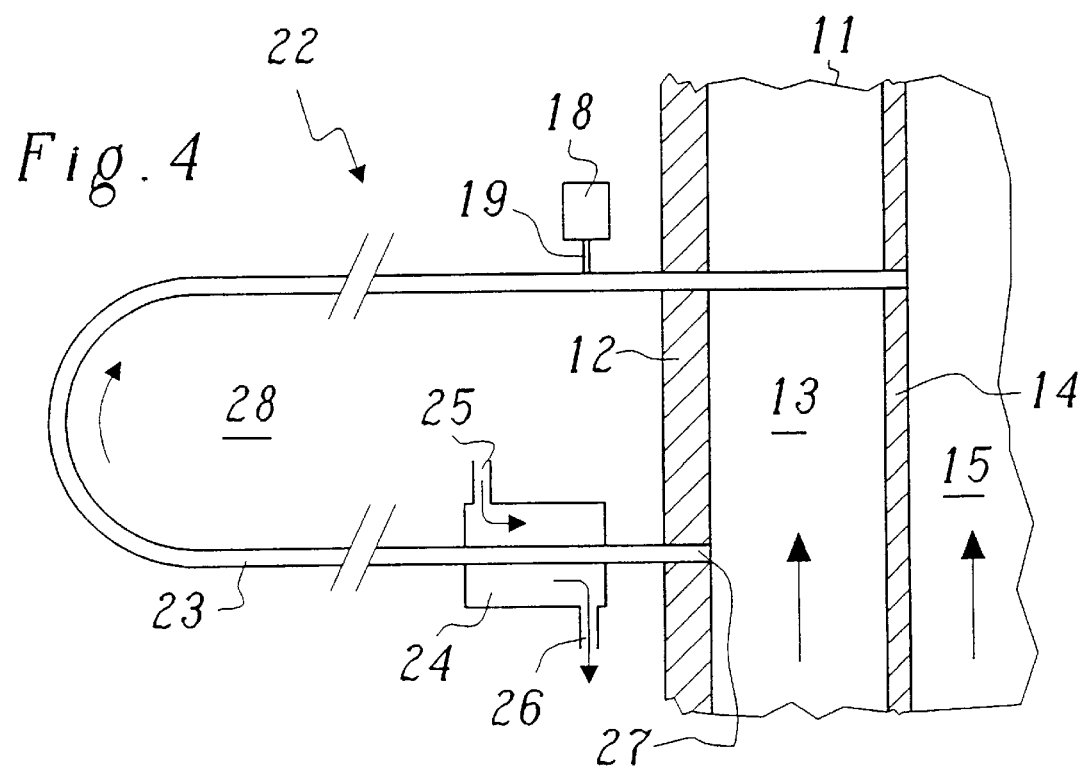

PRESSURE-MEASURING DEVICE

BACKGROUND OF THE INVENTION

1. Field of the Invention

The present invention relates to the field of pressure-measuring technology. It relates to a pressure-measuring device for measuring pressure fluctuations in a space which is filled with hot gases at a first temperature and is delimited by at least one wall from an outer space which is at a lower second temperature, in particular for measuring pressure fluctuations in the combustion chamber of a gas turbine, in which pressure-measuring device a measuring tube largely free of end reflections with regard to the pressure fluctuations is passed from the space through the at least one wall into the outer space, and in which, in the outer space behind the at least one wall, a pressure sensor for sensing the pressure fluctuations is connected to the measuring tube.

Such a pressure-measuring device is known in principle from the prior art.

2. Discussion of Background

It is known to measure pressure fluctuations in a combustion chamber, in which hot gases are under varying pressure conditions, using a comparatively simple device and with considerable accuracy. The device consists of a long thin tube which has a length of about 20 m and is connected with one end to the combustion chamber at the location where the pressure or the pressure fluctuations are to be measured. The actual pressure sensor is connected laterally to the thin measuring tube outside the hot combustion chamber in the markedly colder ambient. It is thereby possible to use a more cost-effective pressure sensor, which does not have to withstand the high temperatures in the combustion chamber. At the same time, simplified access to the pressure sensor arranged on the outside is obtained, as a result of which maintenance and repair are simplified and their costs are reduced.

The essential idea behind the pressure-measuring device described is to design the measuring tube, which forms an acoustic line for the pressure oscillations to be measured, in such a way that virtually no pressure waves are reflected in the tube within a large frequency range and thus distort the measurements taken with the pressure sensor. The long thin tube serves to exponentially dampen the pressure waves running into the tube from the measuring location, so that reflections from the tube back to the pressure sensor are largely avoided.

Despite the exponential damping of the measuring tube, however, problems with wave reflections may occur. If there are comparatively abrupt temperature changes over the length of the measuring tube, as inevitably arise when the tube is passed to the outside from a combustion chamber through an intermediate space having multiple shielding, reflections of the pressure waves running in the tube may be caused at these jumps in temperature and these reflections arrive back at the pressure sensor and distort the measurement there. In the process, the distortion of the measurements increases with increasing frequency of the pressure oscillations.

SUMMARY OF THE INVENTION

Accordingly, one object of the invention is to provide a novel pressure-measuring device which avoids or at least drastically reduces a distortion of the pressure measurements due to reflected pressure waves.

This object is achieved in a pressure-measuring device of the type mentioned at the beginning in that provided on the measuring tube are first means which prevent disturbing reflections of the pressure waves, spreading in the measuring tube, at jumps in temperature in the measuring tube or render said reflections harmless before entry into the pressure sensor. In principle, it would also be conceivable to describe reflections at jumps in temperature along the measuring tube by a mathematical/physical model and to include them in a correcting manner in the analysis of the measurements. However, such a solution is complicated and inflexible in use. In contrast, by the first means according to the invention at the measuring tube, wave reflections are suppressed or rendered harmless directly in the measuring tube, so that the true signal from the measuring location is available directly at the pressure sensor.

A first preferred embodiment of the pressure-measuring device according to the invention is distinguished by the fact that there are jumps in temperature in the measuring tube, that the pressure-wave reflections occurring at the jumps in temperature in the measuring tube are compensated for by reflections at corresponding jumps in diameter at the inside diameter of the measuring tube, that the jumps in diameter in the measuring tube are arranged at the locations of the jumps in temperature, and that the respective diameters of a jump in diameter are selected in such a way that the ratio of the diameters of a jump in diameter is equal to the fourth root from the reciprocal ratio of the temperatures of the associated jump in temperature. The jumps in diameter can be made in the measuring tube without great expense. However, it is disadvantageous that full compensation in the case of fixed jumps in diameter is also only achieved for fixed jumps in temperature.

A second preferred embodiment of the pressure-measuring device according to the invention is distinguished by the fact that the first means are designed in such a way that they prevent the occurrence of jumps in temperature in the measuring tube. In this way, instead of compensation for reflections which have already arisen, the causes of the reflections are removed directly. This results in a high measuring accuracy of the system over a very wide frequency range and virtually irrespective of the temperatures present.

In a first preferred development of this embodiment, the first means comprise a cooling-gas source, from which cooling gas flows through the measuring tube from the outer space into the hot-gas space, and inert gas is used as cooling gas. In this way, the cooling necessary for a uniform temperature distribution in the measuring tube can be set and controlled independently of the space to be measured. However, a separate cooling-gas source is necessary, which requires increased installation expenditure.

In a second preferred development of this embodiment, the hot-gas space is the combustion chamber of a gas turbine, compressed combustion air is fed to the combustion chamber, and some of the compressed combustion air is branched off and flows as cooling air through the measuring tube from the outer space into the hot-gas space. In this case, a separate cooling-gas source is not required, as a result of which the pressure-measuring device is substantially simplified.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a second preferred exemplary embodiment of the pressure-measuring device according to the invention, with cooling of the measuring tube by cooling gas from an external cooling-gas source for avoiding jumps in temperature; and FIG. 4 shows a variant of FIG. 3 which is especially suitable for gas turbines and in which combustion air compressed upstream for the cooling of the measuring tube is bled from the plenum, is fed through a cooler and is fed into the measuring tube.

DESCRIPTION OF THE PREFERRED EMBODIMENTS

Figure 1:
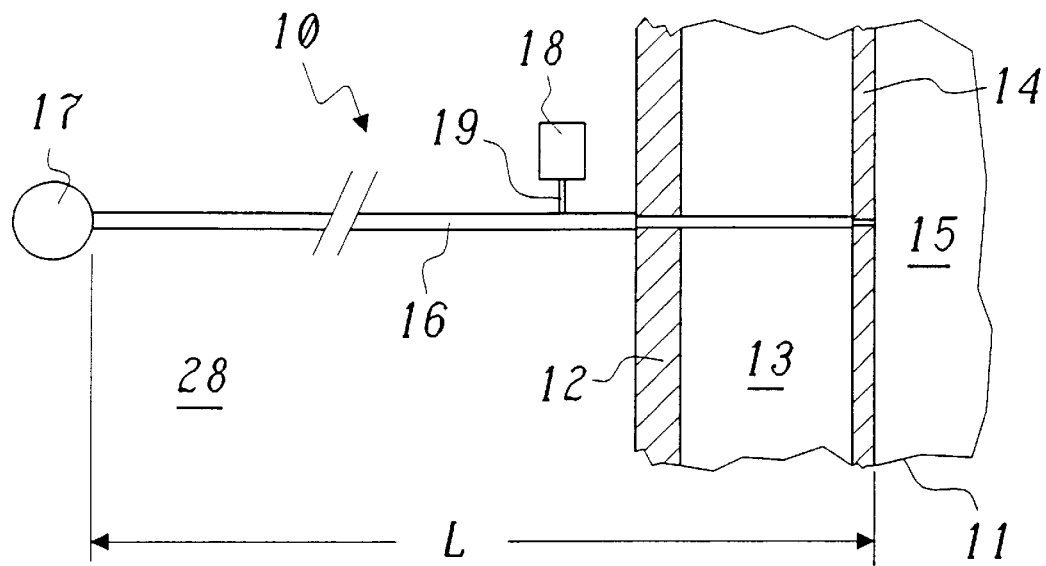
FIG. 1 shows in section a first preferred exemplary embodiment of the pressure-measuring device according to the invention, having diameter steps for compensating for the reflections at the temperature steps.

Referring now to the drawings, wherein like reference numerals designate identical or corresponding parts throughout the several views, a first preferred exemplary embodiment of the pressure-measuring device according to the invention, having diameter steps for compensating for the reflections at the temperature steps, is reproduced in section in FIG. 1. The pressure-measuring device 10 measures the pressure fluctuations or oscillations in a combustion chamber 15, which is separated by a combustion-chamber wall 14 from a plenum 13, which is arranged between the combustion-chamber wall 14 and the casing 12 of a gas turbine 11. Flowing in the plenum 13 is the combustion air, which is compressed in the compressor part of the gas turbine 11 and is at a temperature T2 (FIG. 2) which is markedly lower than the temperature T1 in the combustion chamber 15. Prevailing outside the gas-turbine casing 12, in the outer space 28, is a further temperature T3, which in turn is markedly lower than the temperature T2 in the plenum 13.

The pressure-measuring device 10 comprises a long (e.g. 20 m) thin (e.g. 4 mm thick) measuring tube 16, which leads with one end at the measuring location into the combustion chamber 15 and is passed through the combustion-chamber wall 14, the plenum 13 and the gas-turbine casing 12 into the outer space 28, where it ends with the other end, for example, in an end volume 17. In the outer space 28 directly behind the gas-turbine casing 12, a pressure sensor 18 is arranged laterally on the measuring tube 16 and is connected to the measuring tube 16 via a connecting tube 19.

Figure 2:
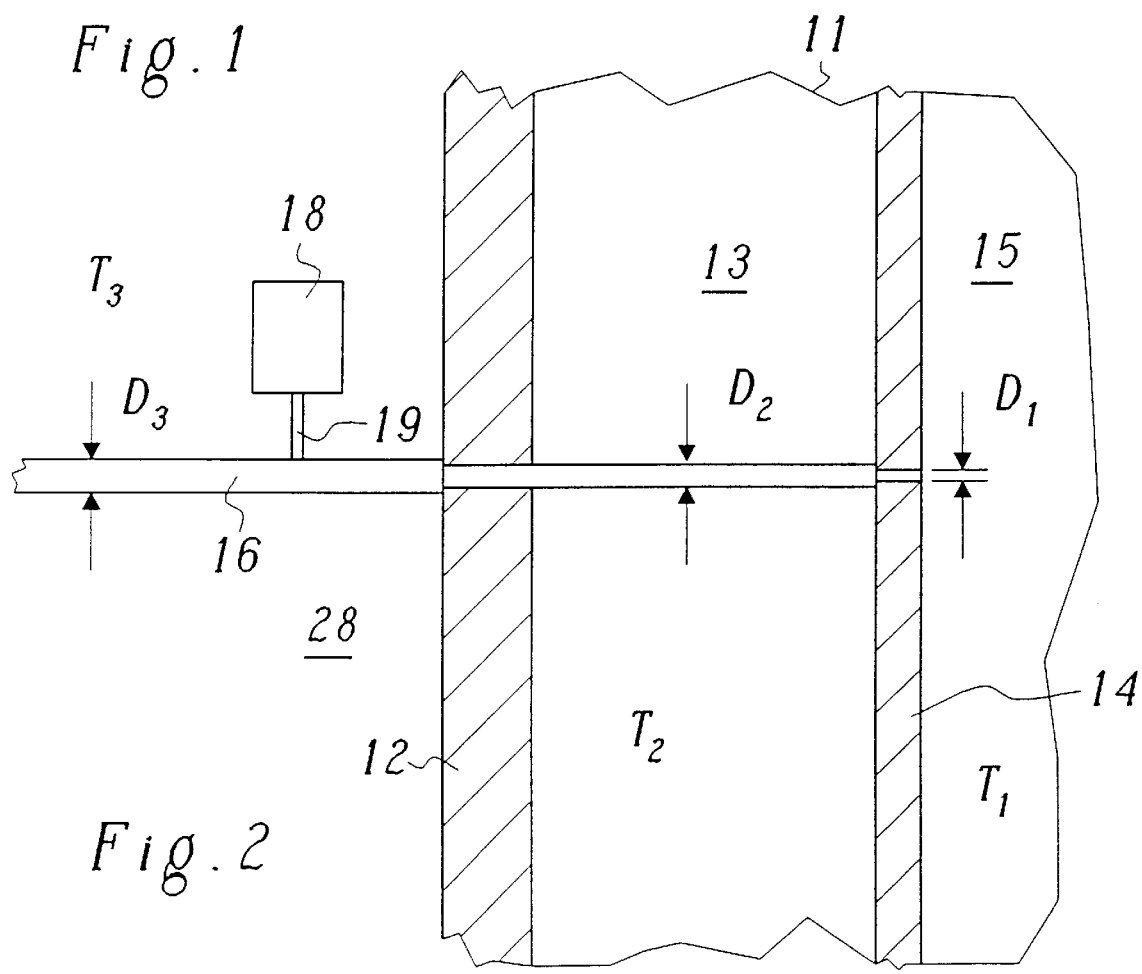
FIG. 2 shows an enlarged detail of FIG. 1 depicting the different diameters of the measuring tube.

As can easily be seen from FIGS. 1 and 2, the measuring tube 16 in the region of the walls 12 and 14 is in each case exposed to a relatively abrupt jump in temperature T3→T2 and T2→T1, which—if no countermeasures were taken—would lead to reflections of the pressure waves running into the measuring tube 16 from the combustion chamber 15 and thus to measuring errors. To compensate for or eliminate the reflections produced at the jumps in temperature, the measuring tube 16 is in each case provided with a jump in diameter at the locations of the jumps in temperature: at the transition from T3 to T2 the diameter of the measuring tube decreases from $D_3$ to $D_2$; at the transition from T2 to T1 the diameter decreases from $D_2$ to $D_1$ (FIG. 2).

So that the desired elimination of the reflections at the jumps is effected, the diameters $D_1 \ldots D_3$ or their ratios must be suitably selected as a function of the temperatures T1 ... T3 or their ratios. The selection of the diameters results from the following analysis:

The measuring tube 16 is divided into three tube sections 1, 2 and 3, which in each case have the diameters $D_1$, $D_2$ and $D_3$. Let the location at the start of each tube section (as viewed from the combustion chamber 15) be designated in each case by 1A, 2A and 3A, and the location at the end of each tube section in each case by 1B, 2B and 3B. If a pair of Riemann invariants f and g are considered, the following relationship is obtained at that end of the measuring tube 16 which faces the outer space, that is, at the location 3B, on account of the boundary condition in the case of an open tube:

$$f_{3B}=g_{3B}(=h) \tag{1}$$

The Riemann invariants may now be combined with one another at the various locations 1A to 3B as follows:

$$f_{3A}=f_{3B}exp(\alpha_3 L_3)exp(i[\alpha_3+\omega/c_3]L_3) \tag{2}$$

$$g_{3A}=g_{3B}exp(-\alpha_3 L_3)exp(-i[\alpha_3+\omega/c_3]L_3) \tag{3}$$

$$2f_{2B}=(c_2/c_3+D_3^2/D_2^2)f_{3A}-(c_2/c_3-D_3^2/D_2^2)g_{3A} \tag{4}$$

$$2g_{2B}=-(c_2/c_3-D_3^2/D_2^2)f_{3A}+(c_2/c_3+D_3^2/D_2^2)g_{3A} \tag{5}$$

$$f_{2A}=f_{2B}exp(\alpha_2 L_2)exp(i[\alpha_2+\omega/c_2]L_2) \tag{6}$$

$$g_{2A}=g_{2B}exp(-\alpha_2 L_2)exp(-i[\alpha_2+\omega/c_2]L_2) \tag{7}$$

$$2f_{1B}=(c_1/c_2+D_2^2/D_1^2)f_{2A}-(c_1/c_2-D_2^2/D_1^2)g_{2A} \tag{8}$$

$$2g_{1B}=-(c_1/c_2-D_2^2/D_1^2)f_{2A}+(c_1/c_2+D_2^2/D_1^2)g_{2A} \tag{9}$$

$$f_{1A}=f_{1B}exp(\alpha_1 L_1)exp(i[\alpha_1 30 \, \omega/c_1]L_1) \tag{10}$$

$$g_{1A}=g_{1B}exp(-\alpha_1 L_1)exp(-i[\alpha_1+\omega/c_1]L_1) \tag{11}$$

$$2\Delta p_{1A}/\rho_1 c_1 = f_{1A}-g_{1A} \tag{12}$$

where $L_1$, $L_2$, $L_3$ in each case denote the length, $D_1$, $D_2$, $D_3$ in each case denote the diameter, $c_1$, $c_2$, $c_3$ in each case denote the velocity of sound, and $\alpha_1$, $\alpha_2$, $\alpha_3$ in each case denote the damping coefficient on account of the Stokes boundary layer of the tube section 1, 2, 3, $\omega$ designates the angular velocity, $\rho_1$ designates the density in the tube section 1, and $\Delta\rho_{1A}$ designates the pressure to be measured at the location 1A. The damping coefficient $\alpha$ may also be written as:

$$\alpha = \sqrt{(2\omega v)} / Dc[1+(\gamma-1)/\sqrt{Pr}] \tag{13}$$

where $\upsilon$ designates the kinematic viscosity, $\gamma$ designates the specific heat ratios, and Pr designates the Prandtl number. Equation (13) represents an approximation which is very accurate as long as the following applies to the thickness of the Stokes boundary layer:

$$\delta_{STOKES} = \sqrt{(v/\omega)} << D. \tag{14}$$

It can easily be seen that this condition is fulfilled very effectively for every situation of technical interest. The cut-off frequency is typically below 1 Hz. It is immediately apparent from equations (4), (5), (8) and (9) that the wave reflection in the case of FIGS. 1 and 2 can be suppressed, if:

$$c_2/c_3-D_3^2/D_2^2=0 \tag{15}$$

and $$c_1/c_2-D_2^2/D_1^2=0 \tag{16}$$

These conditions are fulfilled exactly if, for example, the variables according to the following table, which are typical of the burner of a gas turbine, are used:

TABLE

| | | |
|---|---|---|
| Frequency range | 1000 | Hz |
| Pressure | 16 | bar |
| 1st tube section | | |
| Temperature $T_1$ | 1673 | K |
| Diameter $D_1$ | 2.577 | mm |
| Length $L_1$ | 0.1 | m |
| γ | 1.3 | |
| Pr | 0.71 | |
| 2nd tube section | | |
| Temperature $T_2$ | 673 | K |
| Diameter $D_2$ | 3.235 | mm |
| Length $L_2$ | 0.4 | m |
| γ | 1.4 | |
| Pr | 0.71 | |
| 3rd tube section | | |
| Temperature $T_3$ | 288 | K |
| Diameter $D_3$ | 4 | mm |
| Length $L_3$ | 50 | m |
| γ | 1.4 | |
| Pr | 0.71 | |

It goes without saying that, in the case of other boundary conditions, other diameter ratios are to be selected accordingly.

Another preferred exemplary embodiment of a pressure-measuring device according to the invention is reproduced in FIG. 3. In this case, too, the pressure-measuring device 20 comprises a measuring tube 21 which is passed out of the combustion chamber 15 through the combustion-chamber wall 14, the plenum 13 and the casing 12 of the gas turbine 11 into the outer space 28. Here, too, the pressure sensor 18 is connected behind the gas-turbine casing 12 to the measuring tube 21 via a connecting tube 19. Here, the temperature ratios (temperature steps) may again be the same as in the example from FIG. 1 or FIG. 2. Unlike the exemplary embodiment of FIG. 1, the measuring tube in FIG. 3 is made with a constant diameter (without diameter steps). In this case, a pressure-wave reflection at temperature steps in the measuring tube is not compensated for; on the contrary, it is simply not permitted. To this end, inert cooling gas is fed from an (external) cooling-gas source 29 through the measuring tube 21 toward the combustion chamber 15. The cooling gas—if the gas flow is of sufficient proportions—keeps the measuring tube 21 at a uniform temperature (e.g. 288 K) over the entire length, so that there are no jumps in temperature and accordingly no reflections can arise. For a measuring tube 21 having a diameter of 4 mm, a cooling output of 100 W is sufficient for this purpose at the above-mentioned temperatures. In this case, the flow velocity in the measuring tube 21 should reach values of about 1 m/s.

A further preferred exemplary embodiment which also provides for cooling of the measuring tube but dispenses with an external cooling-gas source is shown in FIG. 4. In this case, the measuring tube 23 is returned through the outer space to the gas turbine 11 and, with the free end upstream of the measuring location, is connected with an inlet opening 27 to the plenum 13. Some of the compressed combustion air which flows in the plenum 13 is branched off and fed as cooling air through the measuring tube 23 from the outer space 28 into the combustion chamber 15. The bled cooling air is in this case preferably fed through a cooler 24 for reducing the temperature, which cooler 24 encloses the measuring tube 23 behind the bleed point. The cooler 24 has an inlet 25 and an outlet 26, through which, for example, water is directed as cooling medium. However, it is also conceivable to use other forms of cooling in order to give the bled compressed air the desired temperature.

On the whole, the invention results in a pressure-measuring device which, without the loss of measuring accuracy, only needs comparatively simple and inexpensive pressure sensors for the measurement of pressure fluctuations or pressure oscillations at hot-gas spaces which are at high temperatures.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A pressure-measuring device (10, 20, 22) for measuring pressure fluctuations in a space (15) which is filled with hot gases at a first temperature (T1) and is delimited by at least one wall (12, 14) from an outer space (28) which is at a lower second temperature (T3), in particular for measuring pressure fluctuations in the combustion chamber (15) of a gas turbine (11), in which pressure-measuring device (10, 20, 22) a measuring tube (16, 21, 23) largely free of end reflections with regard to the pressure fluctuations is passed from the space (15) through the at least one wall (12, 14) into the outer space (28), and in which, in the outer space (28) behind the at least one wall (12, 14), a pressure sensor (18) for sensing the pressure fluctuations is connected to the measuring tube (16, 21, 23), wherein provided on the measuring tube (16, 21, 23) are first means which prevent disturbing reflections of the pressure waves, spreading in the measuring tube (16, 21, 23), at jumps in temperature in the measuring tube (16, 21, 23) or render said reflections harmless before entry into the pressure sensor (18).

2. The pressure-measuring device as claimed in claim 1, wherein there are jumps in temperature (T1→T2; T2→T3) in the measuring tube (16), and wherein the pressure-wave reflections occurring at the jumps in temperature (T1→T2; T2→T3) in the measuring tube (16) are compensated for by reflections at corresponding jumps in diameter ($D_1$→$D_2$; $D_2$→$D_3$) at the inside diameter of the measuring tube (16).

3. The pressure-measuring device as claimed in claim 2, wherein the jumps in diameter ($D_1$→$D_2$; $D_2$→$D_3$) in the measuring tube (16) are arranged at the locations of the jumps in temperature (T1→T2; T2→T3).

4. The pressure-measuring device as claimed in claim 3, wherein the respective diameters of a jump in diameter ($D_1$, $D_2$ and $D_2$, $D_3$ resp.) are selected in such a way that the ratio of the diameters of a jump in diameter ($D_3/D_2$ or $D_2/D_1$) is equal to the fourth root from the reciprocal ratio of the temperatures of the associated jump in temperature ($[T2/T3]^{1/4}$ or $[T1/T2]^{1/4}$).

5. The pressure-measuring device as claimed in claim 1, wherein the first means (24 . . . 27; 29) are designed in such a way that they prevent the occurrence of jumps in temperature in the measuring tube (21, 23).

6. The pressure-measuring device as claimed in claim 5, wherein the first means comprise a cooling-gas source (29), from which cooling gas flows through the measuring tube (21) from the outer space (28) into the hot-gas space (15).

7. The pressure-measuring device as claimed in claim 6, wherein an inert gas is used as cooling gas.

8. The pressure-measuring device as claimed in claim 5, wherein the hot-gas space is the combustion chamber (15) of a gas turbine (11), wherein compressed combustion air is fed to the combustion chamber (15), and wherein some of the compressed combustion air is branched off and flows as cooling air through the measuring tube (23) from the outer space (28) into the hot-gas space (15).

9. The pressure-measuring device as claimed in claim 8, wherein the combustion chamber (15) is surrounded by a plenum (13), through which compressed combustion air flows, wherein the cooling air is bled from the plenum (13) upstream of the measuring location of the measuring tube (23), and wherein the bled air is fed through a cooler (24) for reducing the temperature.

10. The pressure-measuring device as claimed in claim 9, wherein the measuring tube (23), for feeding in the cooling air, is connected with its free end directly to the plenum (13), and wherein the cooler (24) encloses the measuring tube (23) behind the bleed point.

* * * * *